(12) United States Patent
Rebsdorf et al.

(10) Patent No.: US 8,398,369 B2
(45) Date of Patent: Mar. 19, 2013

(54) METHOD AND SYSTEM FOR OPERATING A WIND TURBINE

(75) Inventors: Anders Rebsdorf, Silkeborg (DK);
Henrik Glent-Madsen, Silkeborg (DK)

(73) Assignee: Gamesa Innovation & Technology, S.L., Sarriguren, Navarra (ES)

( * ) Notice: Subject to any disclaimer, the term of this patent is extended or adjusted under 35 U.S.C. 154(b) by 705 days.

(21) Appl. No.: 12/262,281

(22) Filed: Oct. 31, 2008

(65) Prior Publication Data

US 2009/0129924 A1    May 21, 2009

(30) Foreign Application Priority Data

Nov. 15, 2007  (EP) ...................................... 07022192

(51) Int. Cl.
*F03D 7/02* (2006.01)
*F03D 1/00* (2006.01)

(52) U.S. Cl. ............................. 416/43; 416/61; 416/147

(58) Field of Classification Search .................... 416/43, 416/61, 147
See application file for complete search history.

(56) References Cited

U.S. PATENT DOCUMENTS

| | | | |
|---|---|---|---|
| 2004/0151575 A1* | 8/2004 | Pierce et al. | 415/1 |
| 2007/0049450 A1* | 3/2007 | Miller | 475/208 |

* cited by examiner

*Primary Examiner* — Alexander Ghyka
(74) *Attorney, Agent, or Firm* — Ladas & Parry LLP (57) ABSTRACT

The present invention relates to a method and a system for operating a Wind Turbine (WTG), which WTG comprises a rotor comprising at least two blades, which blades are pitch regulated, where the rotor is connected to a shaft, which shaft is supported by bearings, and which shaft drives at least one generator, where the WTG uses a load regulation system for regulating the individual pitch of at least two blades. The object of the invention is to compensate for asymmetric load on the rotor in a wind turbine, a second object is to reduce wearing at shaft bearings in the wind turbine, and a third object is to increase the power production of a wind turbine. This can be achieved if the load regulation system measures the actual rotor load by at least one displacement sensor, which displacement sensor is measuring the bending of the main shaft, where the load regulation system based on the shaft bending regulates the individual pitch of the blades for compensating asymmetric load at the rotor.

10 Claims, 10 Drawing Sheets

METHOD AND SYSTEM FOR OPERATING A WIND TURBINE

FIELD OF THE INVENTION

The present invention relates to a method for operating a Wind Turbine (WTG), which WTG comprises a rotor comprising at least two blades, which blades are pitch regulated, where the rotor is connected to a shaft, which shaft is supported by bearings, and which shaft is driving at least one generator, where the WTG uses a load regulation system for regulating the individual pitch of at least two blades.

The present invention further relates to a system for pitch regulation of a Wind Turbine (WTG) comprising a rotor, which rotor comprises at least two blades, which rotor is connected to a shaft, which shaft is supported by at least a first bearing and a second bearing, which first bearing is carrying the rotor, where the second bearing supports the other end of the shaft, which shaft is further connected to a generator, which pitch regulation system regulates individual pitch of at least two blades.

BACKGROUND OF THE INVENTION

Wind turbines (WTG) above 1 MW normally use individual pitch regulation to reduce load forces and to improve the cost effectiveness of the WTG. Asymmetrical loadings across the rotor are responsible for a significant contribution to fatigue loads and in principle it is possible to reduce these loads by controlling the pitch separately according to the conditions experienced by each blade. The pitch angle will normally have a position from approx 5 to 90 degrees. To decide whether the angle of attack has to be adjusted, some kind of load measurement system on the blades or on the shaft must be integrated in the WTG. Hereafter the controller can generate the estimated pitch demand signals for each pitch control system.

Different measurement sensors are used today. Strain gauges in the blades roots are used. Also Accelerometers in the blade tips are also well known. Optical fibers such as Smartfiber and Insensys can be mounted on or in the blades. These detectors are all rotating with the blades and measuring results have to be communicated from the rotating rotor towards a non rotating control system. Disadvantages for all these systems are the price, lifetime and reliability.

US20040151575A1 and US20040151577A1 concern both a method and apparatus for wind turbine rotor load control. Vertical and horizontal wind shears yaw misalignment and/or turbulence act together to produce asymmetric loading across a wind turbine rotor. The resultant load produces bending moments in the blades that are reacted through the hub and subsequently to the low-speed shaft. As a result, the main shaft and main shaft flange are displaced from their rest or non-aerodynamic load positions. The amount of shaft flange displacement is measured using one or more sensors. The output signals from the sensors are used to determine the magnitude and/or the orientation of the resultant rotor load. This information is used to effect the blade pitch change needed to reduce the load and thereby reduce fatigue and loading on various turbine components.

EP1243790A1 concerns a Wind generator, which has a rotor with at least one rotor blade for converting the wind flow energy into mechanical energy. An adjustment device adjusts the rotor blades individually, and a generator is coupled to the rotor to convert the mechanical energy into electrical energy. The instantaneous stress placed on sections of the wind generator installation is determined by a measurement system. A control system (8) determines the appropriate position of the rotor blade to provide this stress and adjusts it accordingly through the adjustment device.

OBJECT OF THE INVENTION

The object of the invention is to compensate for asymmetric load on the rotor in a wind turbine, a second object is to reduce wearing at shaft bearings in the wind turbine, and a third object is to increase the power production of a wind turbine.

DESCRIPTION OF THE INVENTION

This can be achieved with a method as described in the preamble to claim 1 if the method is modified so that the load regulation system measures the actual rotor load by at least one displacement sensor, which displacement sensor is measuring the bending of the main shaft, where the load regulation system based on the shaft bending regulates the individual pitch of the blades for compensating asymmetric load at the rotor.

This can lead to an adjustment of the pitch of the blades. Where the load on the blades is minimum, the pitch angle is increased in order to achieve a higher load on the blade in order to adjust the asymmetric load to a minimum at the rotor. Further for the blade under high load, the pitch angle can be decreased for reducing the load. This adjustment into a symmetric load can by itself lead to an increasing power production. Due to the reduction of the bending on the shaft, the load on the bearings will also be reduced which can lead to an increasing lifetime of the main bearing in the wind turbine. In practice, the wind shear will be in the way where the load on the blades are maximum at the top and minimum at the lowest blade, but in actual life wind shear can be much more complicated. In normal situations, one single displacement sensor at the shaft could lead to a highly efficient regulation if the pitch regulation system is so fast operating that the pitch can be adjusted inside one single rotation of the rotor.

A number of displacement sensors can measure the shaft bending from different directions, which sensors are connected to the load measuring system, in which load measuring system the actual size and angle of the shaft bending is calculated. By using a number of sensors around the shaft, it is possible to measure all different kinds of asymmetric load on the rotor. In a situation where another wind turbine or maybe a building gives a horizontal wind shear for the wind turbine, this can lead to a situation where the asymmetric load one side of the rotor is high and where the opposite side has a reduced load. In every situation where the load on a rotor is different from one side to another, it is possible by pitch control to adjust the rotor load into a mostly symmetric load situation if sensors are measuring the displacement of the main shaft.

The shaft can be supported by at least a first bearing near the rotor and at least a second bearing at the other end of the shaft, where the shaft has an unsupported section between the first and second bearings, where the displacement sensors are measuring the shaft bending at least at a position between the bearings. In a wind turbine, there will probably be a number of bearings for supporting the main shaft and for carrying the rotor. These bearings are often placed in a first group near the rotor and a second group near the other end of the main shaft. Between these groups of bearings, there is a section of the shaft where bending exists when unsymmetrical load occurs on the rotor. The displacement of the main shaft is easy to measure because the size of the displacement can be up to 1 mm. The optimal place for this measurement could be between the bearings maybe in the middle, but other positions could also be used. The displacement is so large that it should be very easy to measure by the detection systems even if it is not possible to place the detector optimal at the shaft.

A number of sensors can be placed at different axial or radial positions in relation to the shaft. In order to achieve a really fast operating system for detection of the shaft bending, it is possible to measure at many different positions. In practice, the number of sensors might be reduced to a relatively low number.

In a preferred embodiment for the invention, four displacement sensors are forming a group of sensors placed around the shaft. The lowest number of sensors which is required for describing displacement all around a circle of 360 degrees will probably be four, but a good picture could be achieved with only three sensors. By letting the sensors measure the surface of the shaft, it is possible by four detectors to indicate all displacement in two detectors where one of them will give a positive response and the other a negative response. Based on input from these four sensors, a computer system can give a good indication of the shaft bending, and clearly indicate the actual bending situation which can be used immediately for an adjustment of the pitch of the blades in order to bring the shaft bending close to zero.

The object of the invention can also be fulfilled with a system as described in the pre-amble to claim 1 if the system is modified so that the pitch regulation system comprises at least one displacement sensor, by measuring at least one difference in distance between mechanical components operating in relation to the main shaft for indicating bending of the main shaft, which main shaft bending forms a input to the pitch regulating system, where the pitch regulating system compensate for asymmetric rotor load by pitch regulation.

It is preferred that the pitch regulation system is cooperating directly with the displacement sensors in order to achieve a fast pitch adjustment depending on the shaft bending. Because the pitch regulation is a manual adjustment of a heavy blade, this adjustment has a small delay before the adjustment is effective. Therefore, no delay is allowed between the shaft displacement detectors and the pitch regulation system.

The system comprises a number of displacement sensors for measuring the actual shaft bending at least at a position between the first and the second bearings.

The system can comprise a number of displacement sensors for measuring the actual shaft bending from different directions, which sensors are connected to the pitch regulation system, which sensors measure the actual size and angle of the shaft bending. By measuring the shaft bending from different positions, the pitch regulation system will achieve full circular information of the shaft bending where size as well as direction are measured and can be used for the pitch regulation.

The shaft in the WTR can be supported by at least a first bearing near the rotor and at least a second bearing at the other end of the shaft, which shaft has an unsupported section between the first and second bearings, where the displacement sensors are measuring the shaft bending at least at a position between the bearings. The unsupported section of the shaft will be very efficient for placing the sensors. Firstly the bending of the shaft is the highest between the bearings and for the secondly, that is a protected place in the wind turbine where detectors are protected from the environment simply because a shielding will typically be around the main shaft where these sensors can be placed under the shield.

The system comprises a number of sensors placed at different axial or radial positions in relation to the shaft. Reducing the number of sensors to three or four is the most efficient way of handling the sensor signals because the number of signal are reduced, which is preferred for further treatment in a computer system which has to operate extremely fast in order to make a very fast pitch regulation.

The simplest way of placing the sensors are placing a group of four sensors just around the shaft. By at least four sensors, a good picture of the shaft bending can be achieved where the size as well as the direction is measured. The bending is a dynamic process which is probably changing all the time depending on change in wind speed. Therefore, the detection system and also the pitch regulation system have to be very fast operating.

In a preferred embodiment four displacement sensors are forming a group of sensors placed around the shaft.

Displacements sensors can be placed in relation to the nacelle mainframe for measuring the differential distance in relation to the hub. Load on the rotor could be measured by measuring the displacement between the hub and nacelle/mainframe. One, two or more displacement sensors could be used. To get redundancy two sensors should be mounted in approx the same position. Sensors could be mounted in left and right side of the nacelle close to the hub.

Instead can displacements sensors be placed at the hub for measuring the differential distance in relation to the nacelle mainframe.

Displacements sensors can be placed in relation to the nacelle mainframe for measuring the differential distance in relation to the generator. Load on the rotor could be measured by measuring the displacement between the generator and nacelle/mainframe. Non asymmetrical load on the rotor means that the shaft will bend. As the generator is mounted on the shaft it means that the generator is displaced, depending on the asymmetrical load. One, two or more displacement sensors could be used. To get redundancy two sensors should be mounted in approx the same position.

Sensors can bee mounted 90 degrees displaced in order to distinguish between yaw and tilt.

DETAILED DESCRIPTION OF THE INVENTION

Figure 1:
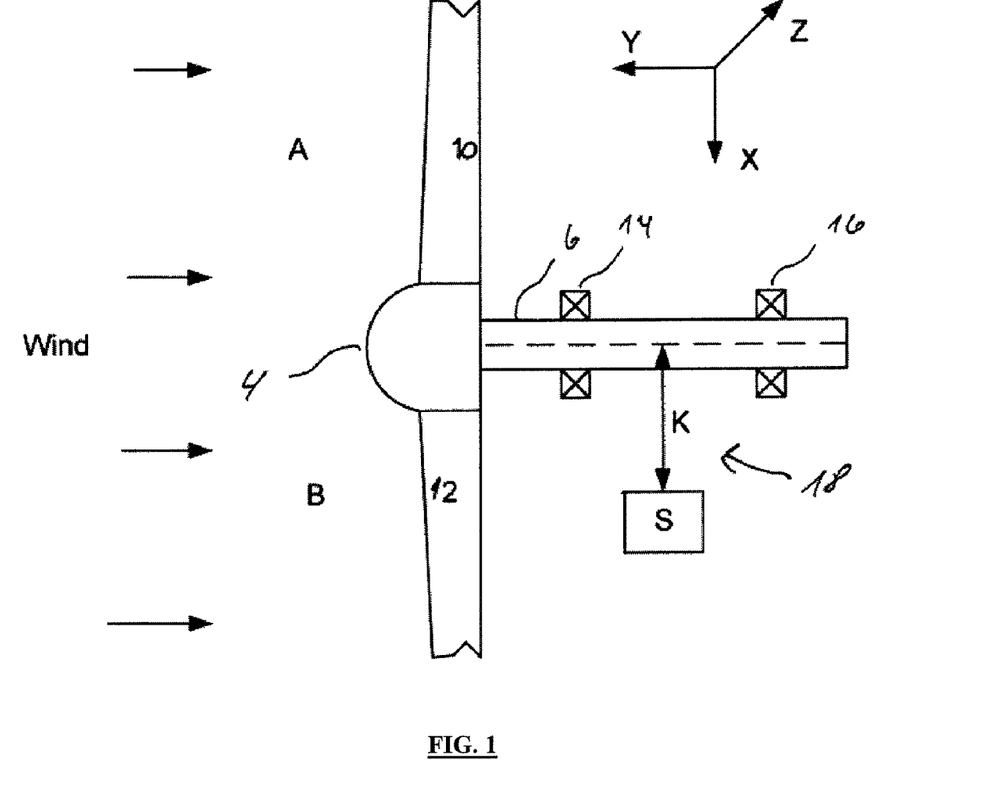
FIG. 1 shows a wind turbine seen from above.

FIG. 1 shows a schematic sectional view of a rotor and a shaft seen from above. The wind turbine 2 comprises a rotor 4 which rotor 4 is connected to a shaft 6. The rotor 4 has two blades 10 and 12, and the shaft 6 is supported by bearings 14 and 16. A displacement sensor 18 detects shaft bending.

By this invention it is possible to measure the load on the blades 10, 12 in a simple, cheap and reliable way. Having a rotor 4 with at least one, preferable two, but also several blades 10, 12 and an axel 6 which is mounted with one, two or more bearings 14, 16, it is possible to measure the shaft bending, caused by the loads on the complete rotor 4.

In the following this is described for a two-bladed WTG. The distance K (se FIG. 1) from the sensor 18 to the unloaded shaft 6 is measured. A higher wind speed in region A compared to region B means a higher load on the blade 10 than Blade 12. As the axel 6 and two bearings 14, 16 not is a totally stiff system, the increased force means a displacement for the centreline in the shaft 6:

$$K=K-L$$

If the load is higher in region B than A, it means $$K=K+L$$

Figure 2:
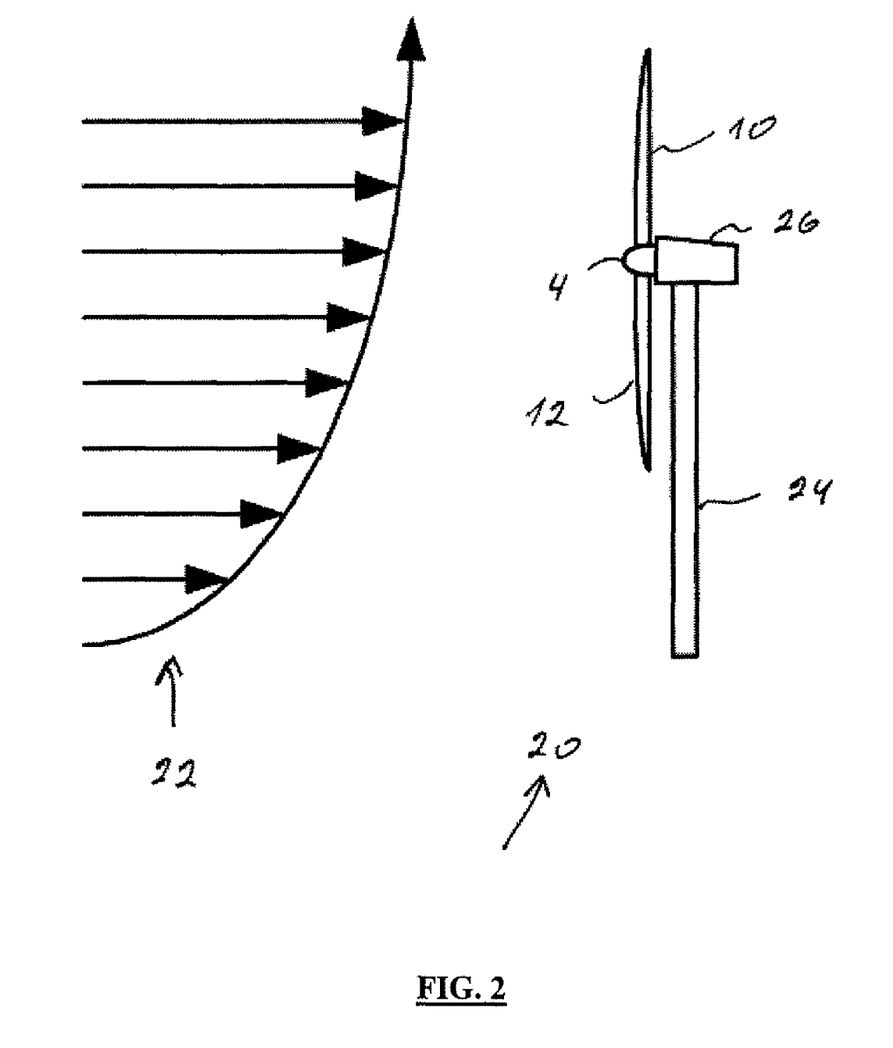
FIG. 2: shows typical wind shear in relation to a wind turbine

FIG. 2 shows a typical wind turbine 20 in relation to a typical wind shear 22. The wind turbine has a rotor 6 which rotor has a first blade 10 and a second blade 12. The rotor is supported to a nacelle 26 which is carried on a tower 24.

FIG. 2 shows that the load is higher in the top of the wind shear 22; it means that the shaft 6 will bend. To reduce the loads in the WTG, this bending force is measured and used to control the pitch angles for the blades 10, 12. Herby can be achieved that the centre of rotor 6 loads is controlled and placed symmetric around the location of the hub.

Figure 3:
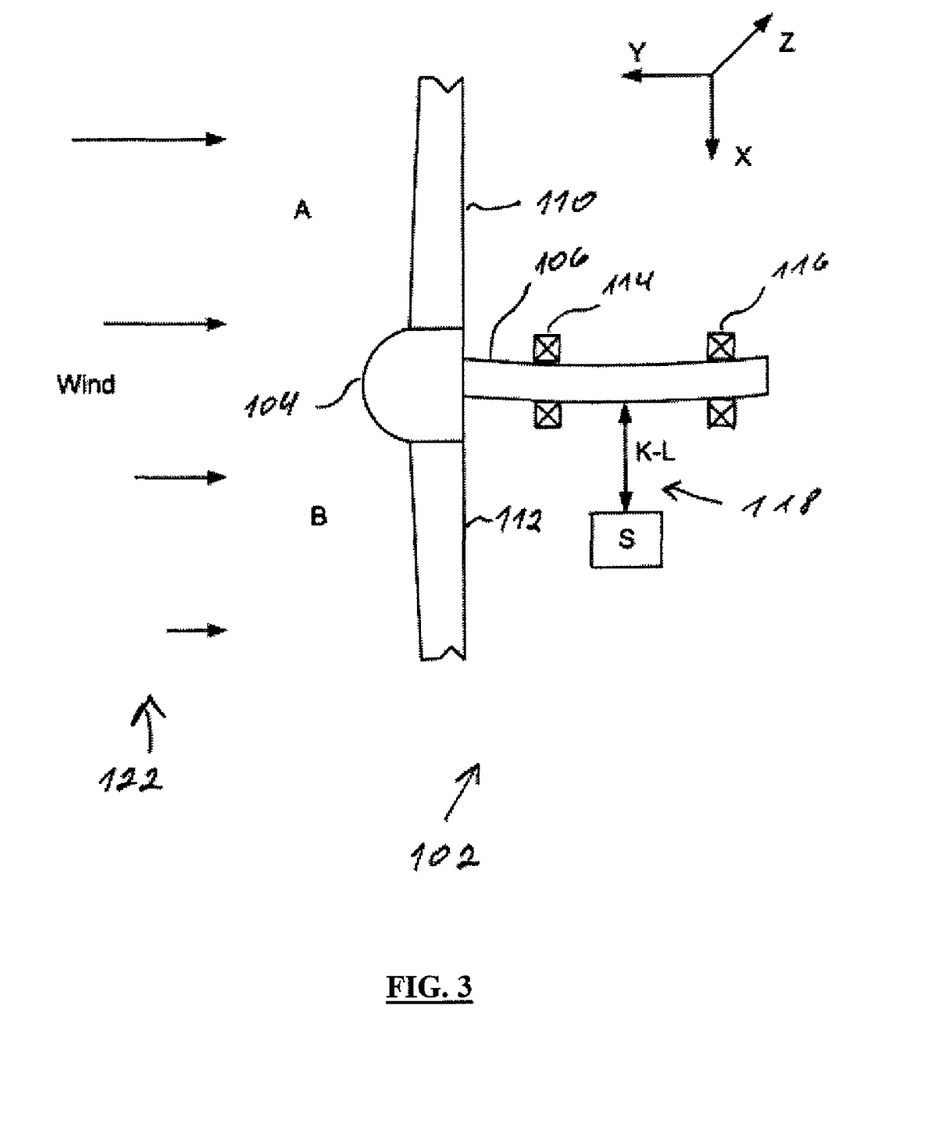
FIG. 3 shows a loaded wind turbine

FIG. 3 shows a partly sectional view of a wind turbine seen from the side. A wind turbine 102 comprises a rotor 104 which rotor is connected to a shaft 106. The rotor 104 comprises blades 110 and 112. The shaft 106 is supported by bearings 114 and 116. A displacement sensor 118 is measuring the displacement of the shaft 106 which in the situation as shown is bended. Because an unsymmetrical wind shear 122 is acting on the blades 110 and 112.

In operation, this will mean that there is a higher load on the blade 110 because the wind has a higher speed at the top than at the bottom at the blade 112. This difference in load results in a torque which is bending the shaft 106, which bending can be indicated by the detector 118.

There could be one, two or more displacement sensors 118. The sensors 118 could be placed along the axel in all positions, between the bearings 114, 116 and on both sides of the bearings 114, 116.

Figure 4:
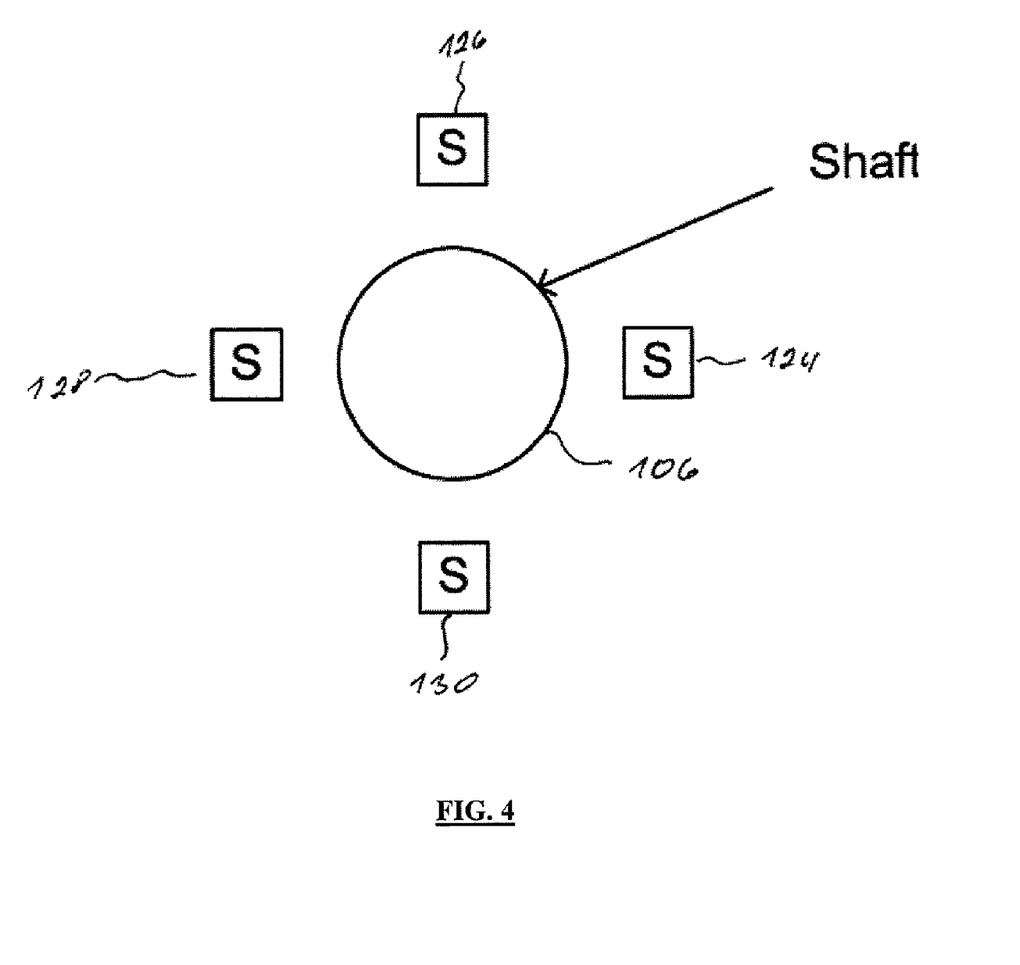
FIG. 4 shows a shaft with four displacement sensors

FIG. 4 shows a shaft with four displacement sensors. The shaft 106 is cooperating with the sensors 124, 126, 128 and 130. These four sensors are able to measure every bending of the shaft 106. If all the sensors 124, 126, 128 and 130 are connected to a computer measuring system, they could easily be calculated into information concerning size and direction of the shaft bending in all 360 degrees. This information could be used for the pitch control of the blades in a wind turbine.

It is also possible to calibrate the sensors (18, 118, 124-130) to take into account the misalignment of sensors (18, 118, 124-130), both statically and dynamically. It is further possible to compensate the sensors (18, 118, 124-130) for torsion in the suspension of the shaft. Change in climate, (temperature and humidity) can be compensated in the system.

The displacement sensors (18, 118, 124-130) could be resistive sensors, capacitive sensors, inductive sensors, magnetic sensors, ultrasonic or laser sensors. Both contact and contact free sensors could be used, incremental or absolute.

Figure 5:
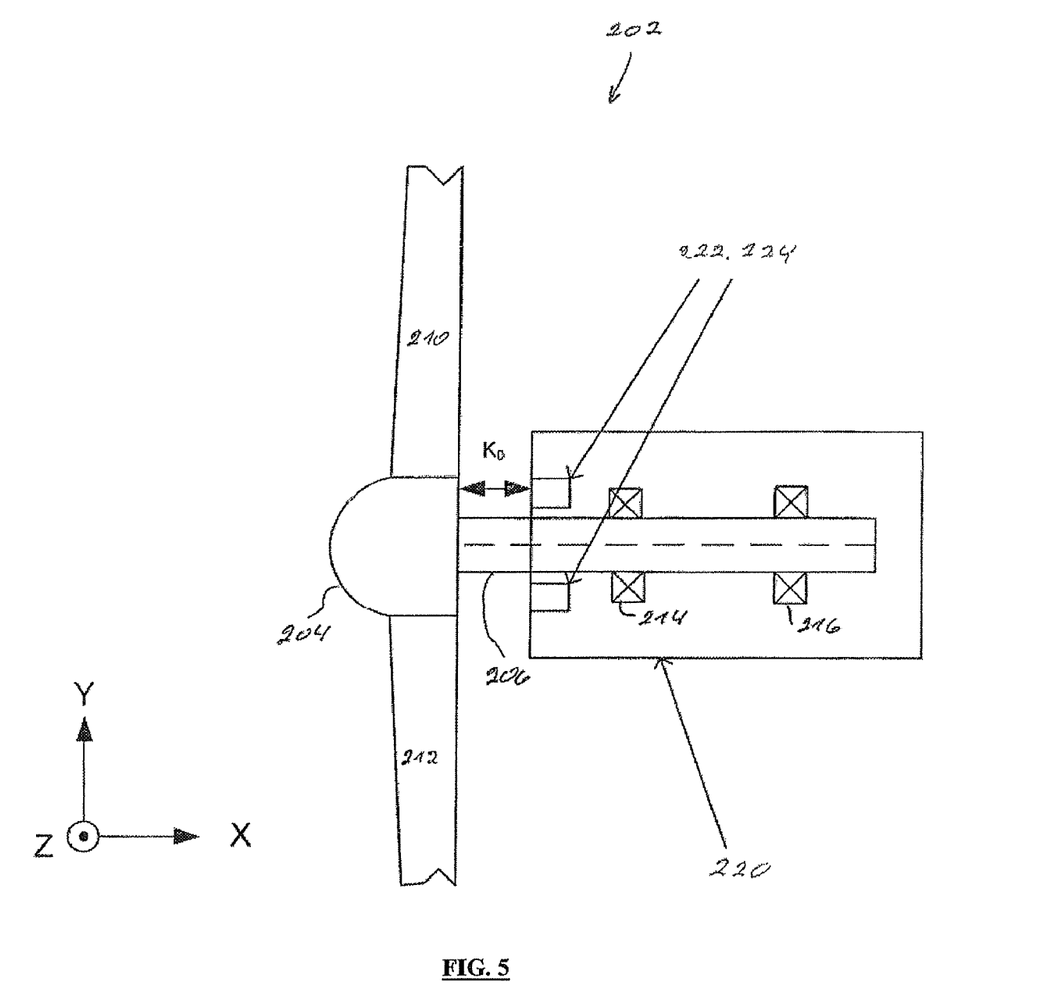
FIG. 5 shows displacement measured between mainframe/nacelle and hub.

FIG. 5 shows a wind turbine 202 which comprises a hub 204 where wings 210 and 212 are connected to the hub 204. The hub 204 is connected to a shaft 206. This shaft is supported by bearings 214 and 216 in a nacelle 220. In the nacelle, displacement sensors 222 and 224 are placed which are measuring the distance $K_0$.

When the wind turbine is in operation, the distance $K_0$ will depend on the load of the rotors 210 and 212. Thus, the load can be measured as a difference in the actual distance between the sensors 222, 224 and the hub 204. One, two or more displacement sensors could be used. To get redundancy, two sensors could be mounted in approximately the same position. Sensors could be mounted in the left hand side of the nacelle close to the hub.

Figure 6:
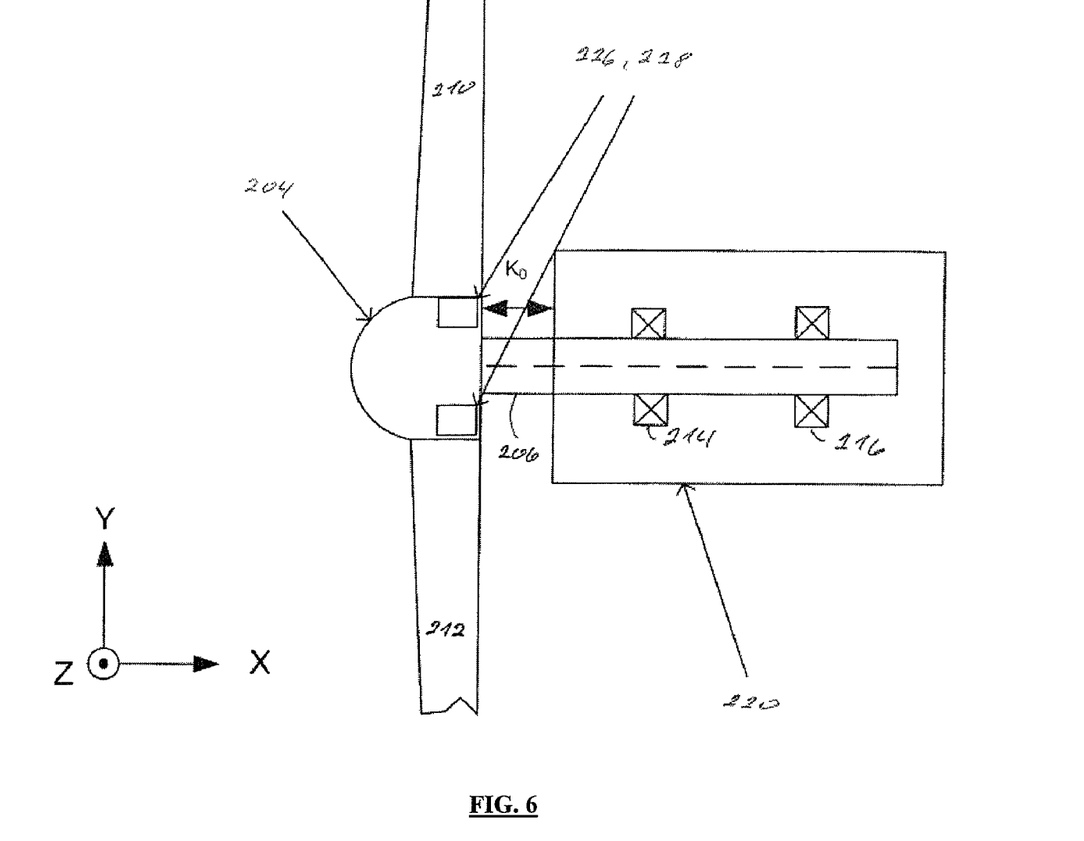
FIG. 6 shows displacement sensors mounted on the hub.

FIG. 6 shows displacement sensors mounted on the hub. All other components refer to the same numbers as mentioned before. In an alternative embodiment of the invention, the sensors 226 and 228 are placed at the hub 204 could instead operate in the opposite direction. In this way, the sensor signals will have to be transformed from the rotating hub 204 to a control unit. These measuring signals will not pose a problem as they can be transmitted over wireless communication means.

Figure 7:
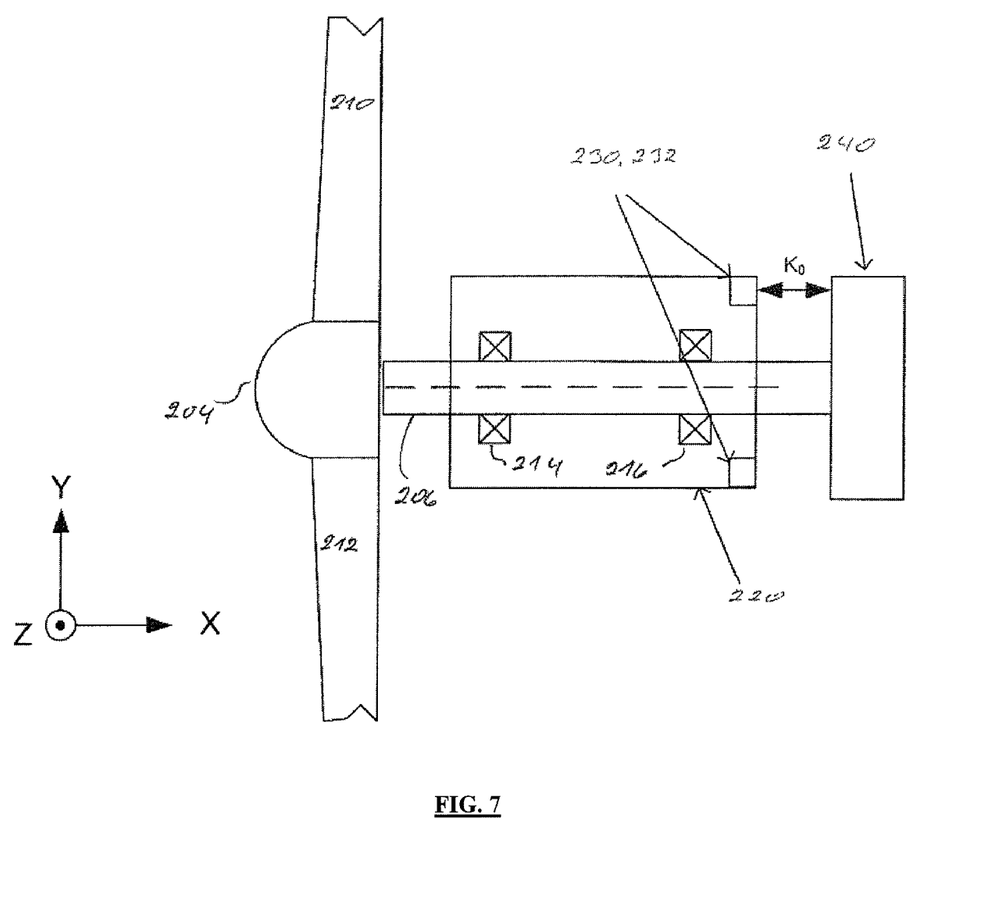
FIG. 7 shows displacement measured between mainframe/nacelle and generator.

FIG. 7 shows an alternative embodiment which only differs in that the sensors 230 and 232 now measure the distance towards the generator 240.

Bending the main shaft 206 will also have influence on the distance between the nacelle and the generator. By placing these sensors 230 and 232 at the back of the nacelle 220, these sensors 230 and 232 will presumably be well protected against wind and weather. One, two or more displacement sensors could be used. To get redundancy, two sensors should be mounted in approximately the same position.

Load on the rotor could be measured by measuring the change of displacement between the generator and nacelle/mainframe. Non asymmetrical load on the rotor means that the shaft will bend. As the generator is mounted on the shaft it means that the generator is displaced, depending on the asymmetrical load. One, two or more displacement sensors could be used. To get redundancy two sensors should be mounted in approx the same position.

Figure 8:
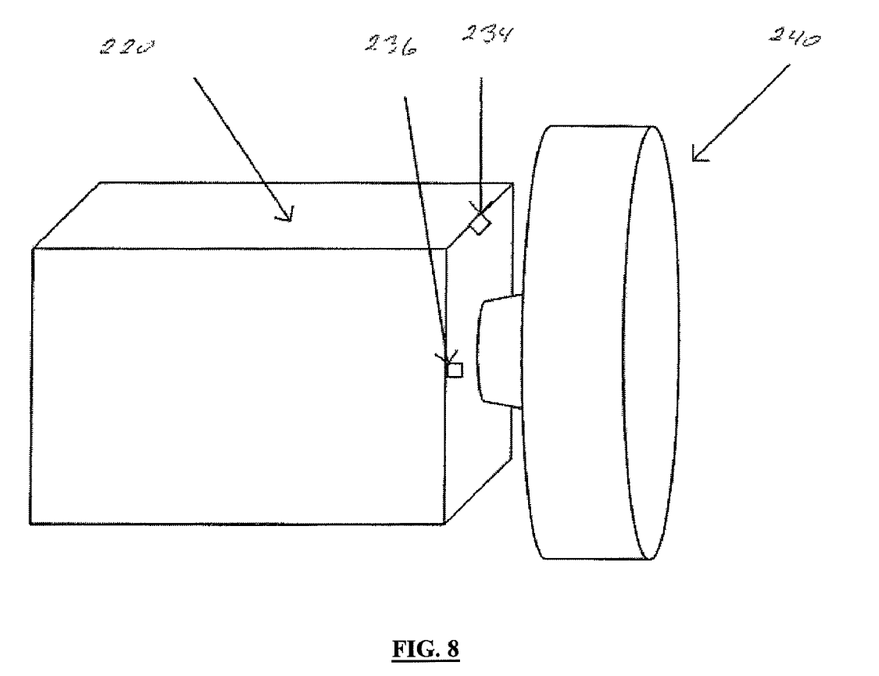
FIG. 8 shows sensors are mounted 90 degrees displaced.

FIG. 8 shows a nacelle 220 and a generator 240 where two different sensors 234 and 236 are placed with a 90 degrees displacement. It is thus possible to distinguish between yaw and tilt at the wind turbine.

It's also possible to calibrate the sensors system to take into account misalignment of sensors both statically and dynamically. Further calibration takes in account temperature changes. The displacement sensors could be resistive sensors, capacitive sensors, inductive sensors, magnetic sensors, ultrasonic or laser sensors. Both contact and contact free sensor could be used, incremental or absolute. The load measurement system could then be used as the primary sensor for the active Yaw control. If the wind shear is asymmetrical and the nacelle not is pointing exactly into the wind it will be possible to measure a displacement on the shaft caused by the unequal load forces on the blades. A Yaw error signal from the displacement sensors is then calculated to a demand signal for the Yaw actuator. Normally this indirect yaw signal must heavily average (filtered) to distinguish between wind direction change and a change in the wind shear. A simple dead band controller could be implemented.

Figure 9:
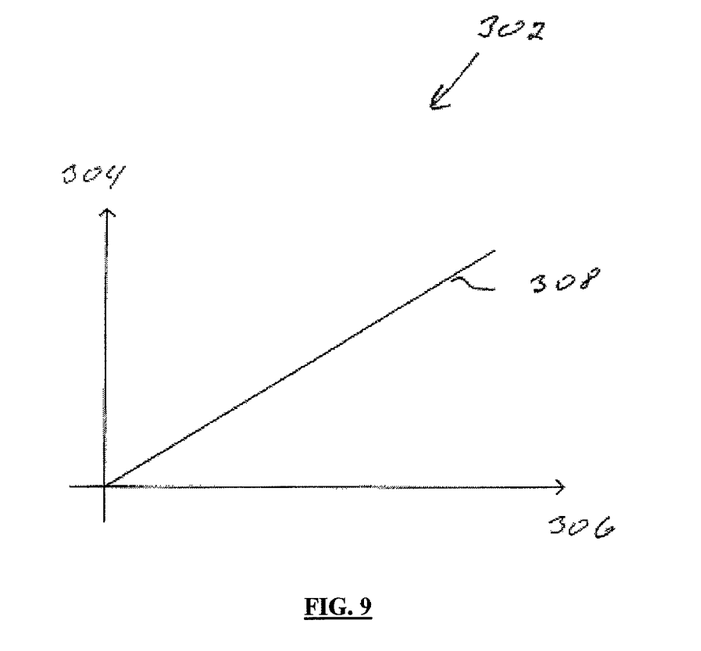
FIG. 9 shows a co-ordinate system.

FIG. 9 shows a co-ordinate system 302 where one axis 304 indicates displacement and the other axis 306 indicates tilt. The curve 308 indicates a linear relation between displacement 304 and tilt 306.

In the collective pitch mode the rotor blade is positioned equally. The wind shear varies over the rotor surface, which means that each blade is forced by different forces/loads. It is therefore necessary to control each blade individually. It is found that here is a good correlation between the shaft displacement and the bending moment in the rotor centre. Different nodal points could be used to determine the relative displacement between main structure and generator.

Figure 10:
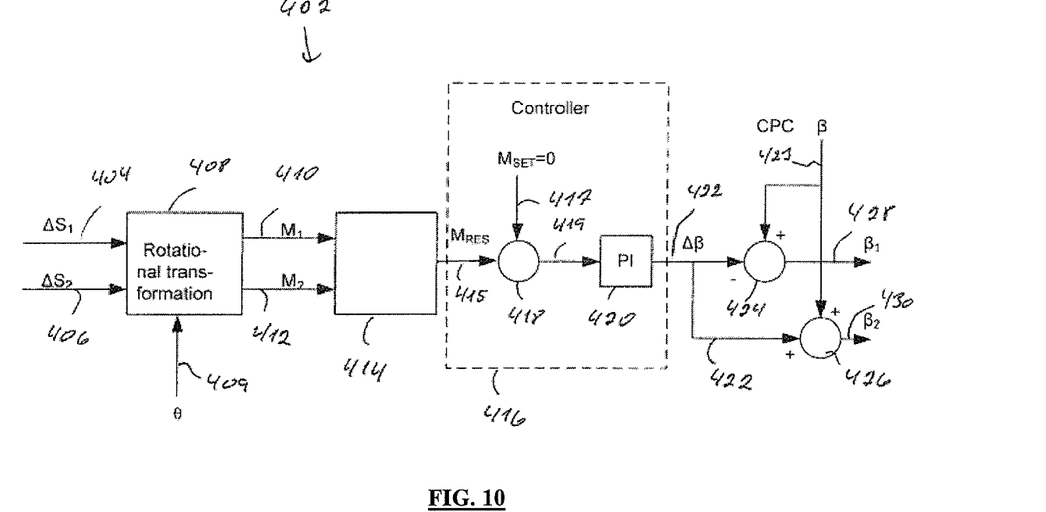
FIG. 10 shows a block diagram of system for an individual pitch two-bladed turbine.

FIG. 10 shows a block diagram of a system 402 for an individual pitch two-bladed turbine. Input from displacement sensors 404 and 406 is in a rotational transformation section 408 where there is also an input 409 which represents the Azimut angle. Output from the rotational transformation 408 is signals 410 and in 412 which two signals 410 and 412 represent the calculated bending moment of the blade. In the block 414, the signals 410 and 412 which represent the calculated bending moment of the blades combined into a combined moment signal $M_{res}$ 415 This signal 415 is sent into a controller 416. In this controller, $M_{res}$ 145 is combined with $M_{set}$ 417 in a combining unit 418 forming a signal 419 This signal 419 is sent to a PI regulator 420 which generates a signal 422 as an output which is a $\Delta\beta$ which represent the Δ pitch demand. This signal 422 is subtracted in a combining unit 424, where the signal β 423 is added. The signal 423 is the actual pitch demand which is used as an input for the system. Based on this input to the combining unit 424, an output $\beta_1$ 428 is generated. Furthermore, the $\Delta\beta$ signal 422 is sent as a positive value to the combining unit 426 where the β signal 423 also forms an input. These two signals 423 and 422 are combined and generate the $\beta_2$ signal 430 which forms the second output line.

FIG. 10 shows individual Pitch two bladed turbine where ΔS is the measured displacement, M is the calculated bending moment at the blade, β is the pitch demand, θ is the Azimut angle, CPC is the collective pitch controller.

It's assumed that $\Delta S_1$ and $\Delta S_2$ are displacements from equilibrium. Displacement values S1 and S2 from the sensors are measured, rotational transformed and converted to moment M1 and M2. The controller setpoint $M_{SET}$ is the reference for a symmetrical load on the rotor. $\Delta\beta$ is the individual pitch demand. $\Delta\beta$ is subtracted to blade 1 and added blade 2. The sign decides the direction of the change for the pitch angle. The rotor azimuth angle θ is determined and used in the control system in order to identify the blade which needs adjustment. Obviously there shall be a relation between azimuth and blade positions, e.g. azimuth equal to zero means blade A is pointing vertically upwards.

Figure 11:
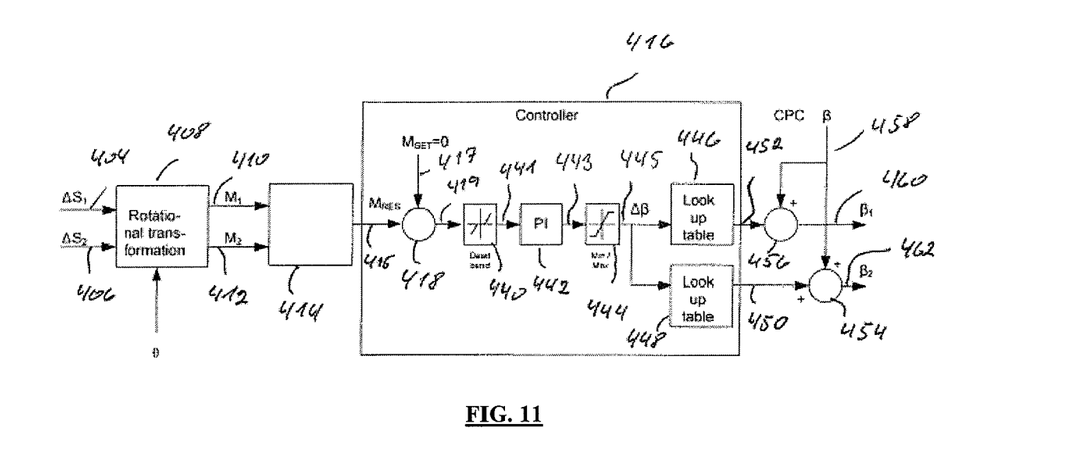
FIG. 11 shows a block diagram of a system as shown in FIG. 10 and now comprising a dead band module.

FIG. 11 shows a block diagram of identical modules to the nodules shown in FIG. 10. Therefore, the part of FIG. 11 in front of the controller 416 is not further described. As already mentioned, the controller 416 comprises the combining unit 418 which has input lines $M_{res}$ 415 and $M_{set}$ 417 for achieving the combined signal 419. This line 419 is now input to a dead band module 440. This generates a signal 441 which is sent to a PI regulator 442. In this regulator, a signal 443 is formed which is sent to a minimum/maximum regulator 444. This minimum/maximum regulator 444 forms a signal 445 $\Delta\beta$ which is the Δ pitch demand. This signal 445 is sent into look up tables 446 and 448. These look up tables form output signals 450 and 452. These signals are sent into a first combining unit 456 where the signal 452 is a negative input, where a signal 458 representing β which is the actual pitch demand. This combining unit 456 is forming the output 460 which is $\beta_1$. The output 450 from the lock up table 448, is sent positively to a combiner 454 which has an input 458 β. The combining unit 454 is forming the output $\beta_2$ 462.

In FIG. 11 is added a dead band zone because of pitch system. A min/max filter is implemented to control speed and max/min pitch angle. A look up table is used to compensate for possible non linearity's in the pitch system. Other controllers to adjust for tower shadow, which is common knowledge and repetitive could be integrated as well.

Figure 12:
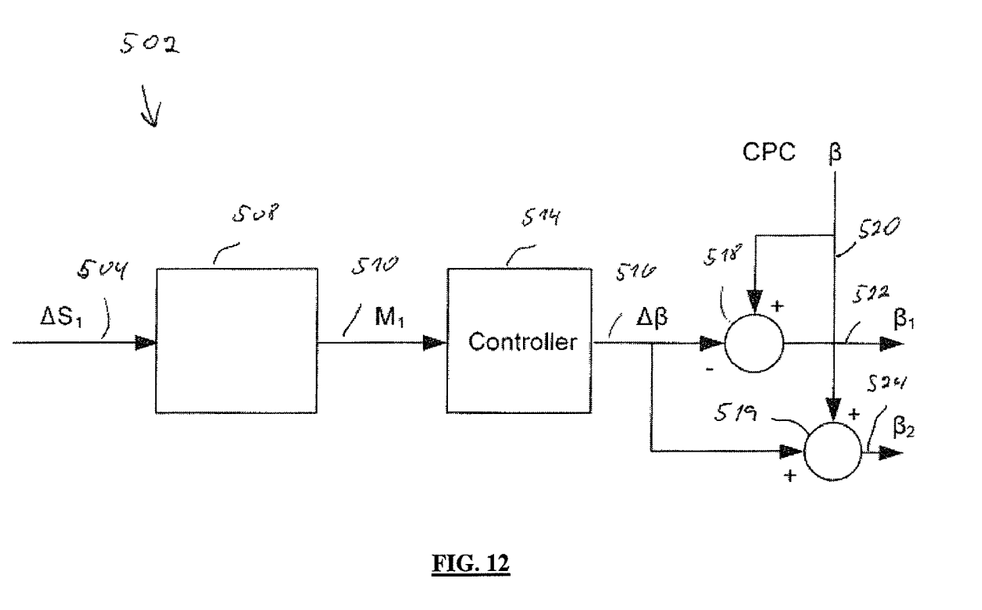
FIG. 12 shows a block diagram where the displacement sensor is placed in the hub.

FIG. 12 shows a block diagram of a system 502 which system 502 is a block diagram where the displacement sensor is placed in the hub. The signal 504 is generated by one or more displacement sensors. This signal 504 forms an input into the block 508 which now only has the function of converting the displacement signal into the bending moment 501 $M_1$. This signal 510 is forwarded to a controller 514. This controller 514 generates an output 516 which is the $\Delta\beta$ signal, and this $\Delta\beta$ signal 516 forms an input, which is used as a negative input in a combining unit 518 where the β signal 520 is used as a positive input. This generates the output $\beta_1$ over the line 522. The $\Delta\beta$ signal 516 is further sent to the combining unit 519 where the signal 519 and the β signal 520 is combined for forming the $\beta_2$ signal 524.

In FIG. 12 is shown a block diagram of a system where the displacement sensor is placed in the hub. In this situation the rotational transformation is avoided and only one displacement sensor is needed. For redundancy two sensors would be preferred.

The invention claimed is:

1. A system for pitch regulation of a Wind Turbine (WTG) comprising:
    a rotor, wherein said rotor comprises at least two blades and is connected to a shaft, which is directly connected to a generator;
    wherein said shaft is supported by at least a first bearing and a second bearing, which first bearing carries the rotor and the second bearing supports the other end of the shaft,
    a pitch regulation system which regulates individual pitch of at least two blades, wherein
    the pitch regulation system comprises at least one displacement sensor,
    wherein at least one displacement sensor measures the bending of the shaft by measuring at least one difference in distance between mechanical components operating in relation to the main shaft for indicating bending of the main shaft, and
    which main shaft bending data measured by the at least one displacement sensor is a direct input to the pitch regulating system, where the pitch regulating system compensates for asymmetric rotor load by pitch regulation.

2. System according to claim 1, wherein the system comprises a number of displacement sensors for measuring the actual shaft bending at least at a position between the first and the second bearings.

3. System according to claim 1, wherein the system comprises a number of displacement sensors for measuring the actual shaft bending from different directions, which sensors are connected to the pitch regulation system, which displacement sensors measure the actual size and angle of the shaft bending.

4. System according to claim 1, wherein the shaft in the WTG is supported by at least a first bearing near the rotor and at least a second bearing at the other end of the shaft, which shaft has an unsupported section between the first and second bearings, where the displacement sensors measure the shaft bending at least at a position between the bearings.

5. System according to claim 1, wherein the system comprises a number of displacement sensors, which displacement sensors are placed at different axial or radial positions in relation to the shaft.

6. System according to claim 1 wherein four displacement sensors form a group of sensors placed around the shaft.

7. System according to claim 1, wherein displacements sensors are placed in relation to the nacelle mainframe for measuring the differential distance in relation to the hub.

8. System according to claim 1, wherein displacements sensors are placed at the hub for measuring the differential distance in relation to the nacelle mainframe.

9. System according to claim 1, wherein displacements sensors are placed in relation to the nacelle mainframe for measuring the differential distance in relation to the generator.

10. System according to claim 1, wherein sensors are mounted 90 degrees displaced in order to distinguish between yaw and tilt.

\* \* \* \* \*